J. T. WHALEN.
PERMUTATION PADLOCK.
APPLICATION FILED JUNE 15, 1908.
923,744.
Patented June 1, 1909.
2 SHEETS—SHEET 1.
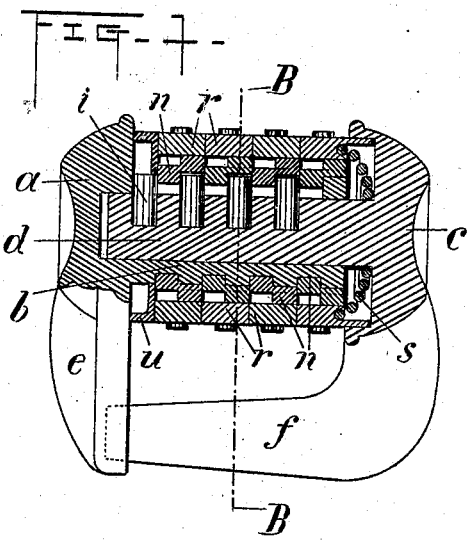
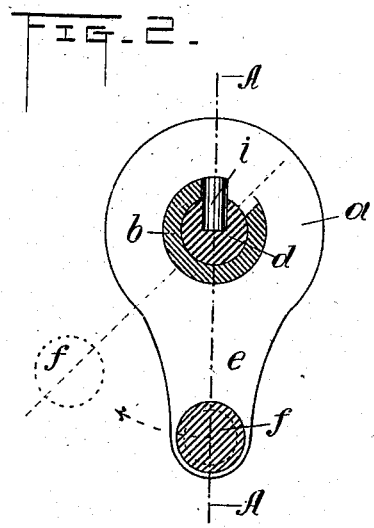
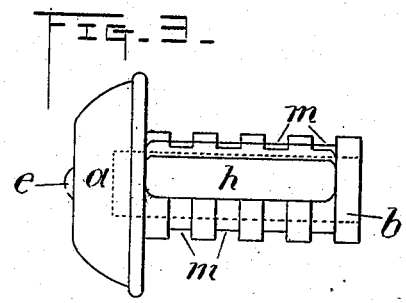
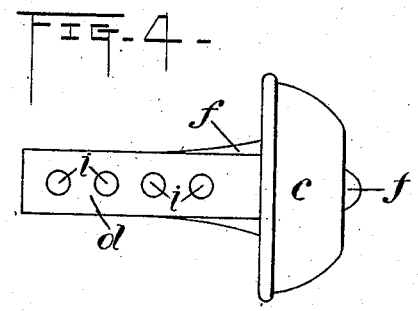
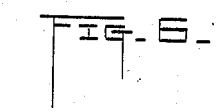
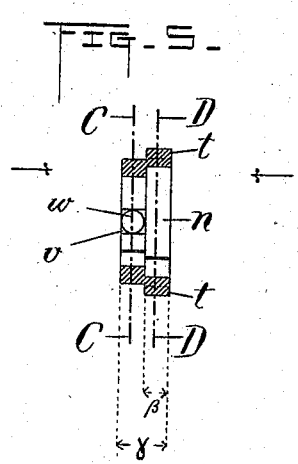
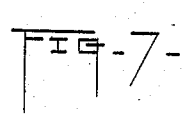
John T. Whalen
Inventor.

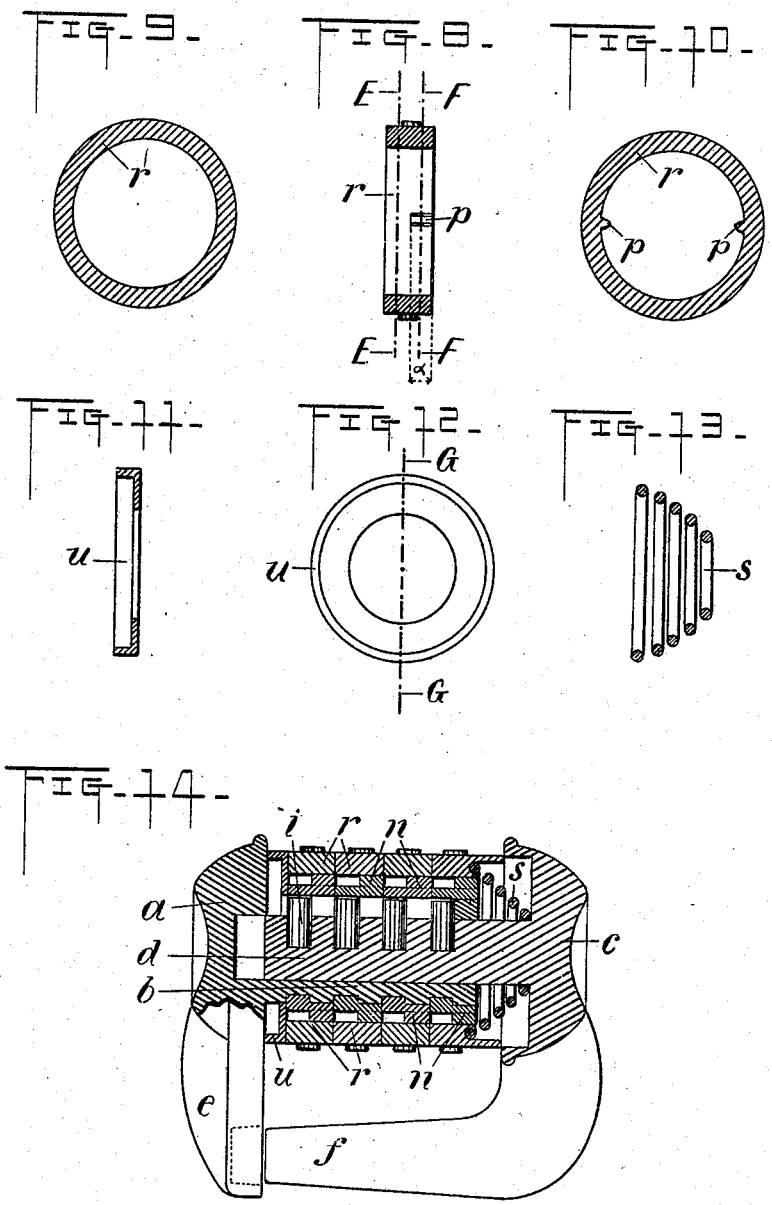

UNITED STATES PATENT OFFICE.

JOHN T. WHALEN, OF NEW YORK, N. Y., ASSIGNOR, BY DIRECT AND MESNE ASSIGNMENTS, TO THE WHALEN COMPANY, OF JERSEY CITY, NEW JERSEY, A CORPORATION OF NEW JERSEY.

PERMUTATION-PADLOCK.

No. 923,744.　　　　Specification of Letters Patent.　　　　Patented June 1, 1909.

Application filed June 15, 1908.　Serial No. 438,637.

*To all whom it may concern:*

Be it known that I, JOHN T. WHALEN, a citizen of the United States, and resident of Greater New York, State of New York, have invented certain new and useful Improvements in Permutation-Padlocks; and I do hereby declare that the following is a full, clear, and exact description of the invention, which will enable others skilled in the art to which it appertains to make and use the same, reference being had to the accompanying drawings, forming part of this specification and illustrating one way in which my invention may be carried into practice, and in which—

Figure 1 is a vertical, central, longitudinal section of my lock when closed, on line A A of Fig. 2, with certain parts in side view; Fig. 2 is a vertical cross section of the main parts of the lock, on line B B of Fig. 1, omitting tumblers and permutating rings; Fig. 3 is a top view of the end piece having the apertured shank; Fig. 4 is a top view of the end piece having the locking bolt; Fig. 5 is a vertical, central, longitudinal section of one of the sectional tumblers; Fig. 6 is a transverse section of a tumbler on line C C of Fig. 5; Fig. 7 is a transverse section of a tumbler on line D D of Fig. 5; Fig. 8 is a vertical, central, longitudinal section of one of the permutating rings; Fig. 9 is a transverse section of a permutating ring on line E E of Fig. 8; Fig. 10 is a transverse section of a permutating ring on line F F of Fig. 8; Fig. 11 is a vertical, central, longitudinal section of an idler on line G G of Fig. 12; Fig. 12 is a front elevation of the idler; Fig. 13 is a vertical, central, longitudinal section of the spiral spring; Fig. 14 is a vertical, central, longitudinal section of my lock when open, on line A A of Fig. 2, with certain parts shown in side view.

This invention relates to padlocks and similar means for securely confining certain separable parts, doors, etc., of whatever description and for whatever purpose, without the use of keys or tools, but more particularly through the medium of devices that are similar to those employed in ordinary permutation locks, and it is held to be an improvement on the correlative matter disclosed in my application for Letters Patent Serial No. 406,019 filed December 1907.

The main object of my invention is to produce a keyless padlock which combines strength with reliability of operation, and whose operating mechanism is comparatively simple and moderate as to cost, to attain which I prefer to construct my padlock without the use of screws or screw-threaded parts, and rivets, of any kind, or of brazed or soldered joints or similar undesirable connections, and to operatingly aggregate its parts in such a manner and through such a certain sequence of certain operations or steps that it is practically impossible to take the same apart or to even detach a single piece therefrom, provided the lock is not cut, sawed, drilled, fused or broken into, or otherwise damaged.

Another object is to arrange the separable connections of the tumblers with their exterior or permutating rings in such a manner that when the lock is open the "combination" may be changed almost instantly by the shifting and subsequent turning of the permutating rings only, leaving all other parts of the lock entirely undisturbed.

A further object is to cause the lock, after the combination has been set correctly, to be opened by spring pressure, this spring pressure also serving to avoid any accidental shifting of the permutating rings when the lock is open, thus avoiding any unintentional changing of the combination.

With the foregoing and additional minor objects in view, my invention consists in the novel features, combination and arrangement of parts, and manner of their assembling, hereinafter more specifically described, illustrated in the accompanying drawings, and particularly pointed out in the claims hereunto appended.

Referring now to the drawings, in which similar characters of reference indicate corresponding parts in all of the figures,—the main frame of my padlock is formed by the two end pieces of which one, as $a$, has a centrally apertured shank $b$, while the other, as $c$, has a locking bolt $d$, which latter is adapted to slide and turn in shank *b* to a limited extent, being, however, at all times engaged with, or retained by, it. These end pieces *a* and *c*, furthermore, extend into parts *e* and *f*, respectively, which are adapted to engage one with the other for the purpose of forming a closed link or shackle when the lock is closed, as is well understood. Shank *b* is provided with a longitudinal slot or aperture, as *h*, which reaches within a certain distance of its open end, and also has on its outer periphery a number of transverse grooves or channels, as *m*, all arranged in planes at right angles to the axis of shank *b*, and to slot *h*, and preferably equi-distant one from the other, which grooves act as supports and ways or bearings for the sectional tumblers *n*. Radially inserted into locking bolt *d*, preferably in the plane of its axis, and equi-distant one from the other, are a number of pins or wards, as *i*, which are adapted to project through slot *h* of shank *b* to engage tumblers *n*. The purpose of slot *h* is, mainly, to limit the motion of end piece *c* and locking bolt *d* relative to end piece *a* and shank *b* through a suitable disposition of wards *i* on said bolt. As shown by Figs. 1, 2, 3, 4 and 14, four grooves are shown provided for on shank *b*, and a like number of wards on the locking bolt, while the extent of the longitudinal motion of this bolt *d* is equal to the diameter of one of the wards. The locking bolt *d* and part *f* may be turned through an arc of about 45 degrees; this, however, only when the same have been moved from the position shown by Fig. 1 to that shown by Fig. 14, to thereby further separate the link extensions *e* and *f* of the end pieces *a* and *c*, respectively, which form the two sections of the shackle, as indicated by the dotted lines of Fig. 2, or as may be desired.

The sectional tumblers *n* I, preferably, arrange in halves, as shown by Figs. 5, 6 and 7, for the purpose of facilitating their placing in grooves *m* in which they are to turn freely when the lock is closed, see Fig. 1. Each tumbler *n* is provided with a longitudinal slot or recess *o* for the purpose of admitting thereinto, and engaging or retaining, one of the wards *i*, and a radial opening *w* for the purpose of passing the said wards therethrough to be attached to the locking bolt when aggregating the parts of the lock; both, recess and radial opening being located in that part of the tumbler which engages its groove *m*, see Figs. 5 and 6.

It is obvious that as soon as each one of the four tumblers shown is turned in its groove into such a position that its recess *o* is opposite its contiguous and corresponding ward *i*, spring *s* will then be able to longitudinally move end piece *c* and locking bolt *d* into the position shown by Fig. 14, thereby disengaging parts *e* and *f*, the ends of which are shaped to act as socket and tenon, respectively, and enabling their further separation by swinging apart the two sections of the shackle, as indicated by Fig. 2 in dotted lines. It is also obvious that afterwards *i* have entered recesses *o*, tumblers *n* can not be turned. One-piece permutating rings *r* surround and encircle tumblers *n* and longitudinally shiftably engage the latter by means of inwardly projecting teeth, as *p*, see Figs. 8 and 10, for which purpose tumblers *n* are also provided, across part of their outer periphery only, with a number of teeth or like projections, as *t*, see Figs. 5 and 7.

In the organization of the parts shown in the drawings, wards *i* have half the width of the tumblers and the extent of the longitudinal motion of the locking bolt is equivalent to the width of the wards. To obtain satisfactory results, the aggregate width of teeth *p* and *t* should not be greater than the width of one of the tumblers, though it may be less, since the extent of the longitudinal motion of the permutating rings for the purpose of changing the combination is equivalent to half the width of the tumblers. It is not necessary that teeth *p* and *t* should be of the same width as shown. Thus, $\alpha + \beta = < \gamma$, see Figs. 5 and 8. The value of $\gamma$ being fixed, the values of $\alpha$ and $\beta$ may be varied *ad libitum*, as long as their aggregate does not exceed the value of $\gamma$.

The outer periphery of permutating rings *r* is, preferably, marked with as many characters as there are teeth on the outer periphery of tumblers *n*. To change the combination, all that is necessary is to longitudinally shift each of the permutating rings *r* from the position shown by Fig. 14, against the pressure of spring *s*, sufficiently to disengage teeth *p* from teeth *t*, and then turn each ring until a certain pre-determined character occupies a certain pre-determined position relative to recess *o*, when teeth *p* and *t* may be brought into suitable engagement again. It is obvious that one or both of the end pieces have markings, not shown, which serve as an index from which to read the combination correctly.

As is seen from Figs. 1 and 14, neither screws nor rivets are used to hold all parts of the lock in place, nor are there any soldered or brazed joints or connections; still, it is practically impossible to disaggregate the organization of parts without breaking or damaging the latter. The assembling or aggregating of the parts of the lock, to be self-locking, is accomplished as follows: A sectional tumbler *n* is placed in its groove *m* with its radial opening *w* above the slot *h* and a permutating ring *r* is slipped over shank *b* and over the tumbler. Another tumbler and permutating ring are then inserted in like manner and this operation is continued until all of the tumblers and permutating rings have been put in place on shank *b* after idler *u* has been placed in position to close the gap between the left terminal tumbler and the end piece *a*. Locking bolt *d*, minus its wards *i*, is then introduced into shank *b* after spring *s* has been placed in the position shown by Fig. 14. When holding the two end pieces *a* and *c* in the position shown by Fig. 14, on successively shifting or sliding the tumblers longitudinally against the pressure of spring *s*, it will be possible to successively insert the wards *i* through radial openings *w* into their respective fixed positions on locking bolt *d*, thereby confining all rotating members of the lock between the two end pieces *a* and *c*. It is obvious that, the wards having thus been attached to bolt *d* in a manner which makes their segregation or elimination an exceedingly difficult task, (being so thoroughly protected by the tumblers and their exterior rings) it is practically an impossibility to disaggregate the lock or to detach a single piece therefrom, without breaking or damaging one or more of the parts of the same.

From Fig. 14 is also seen that when the lock is open, spring *s*, by pressing against the permutating rings *r*, prevents the latter from becoming accidentally disengaged from the tumblers *n* and thus practically prevents any unintentional changing of the combination, a matter of considerable moment since, should the combination become changed without the knowledge of the operator the lock may then not only prove useless thereafter but cause considerable annoyance through the fact that it can not possibly be opened without damage if the combination is not known.

I do not wish to be confined to the means and details before described and shown as the same may be varied without deviating from the spirit of my invention. For example, I may combine longitudinal recesses *o* and radial openings *w*, on tumblers *n*, into one opening of suitable dimensions. I also may, by adapting certain alterations and modifications employ a hinged, or other, shackle instead of a sliding one. I may provide one-piece tumblers and suitably alter the supporting shank, and vary the form of teeth or means for separably connecting the tumblers with their exterior rings, all of which suggested possible modifications are not shown.

Having described my invention and in what manner the same may be carried into practice, what I claim as new and desire to secure by Letters Patent granted unto me is:

1. In a lock of the class described,—an apertured shank,—a locking bolt adapted to have wards removably attached thereto, movably retained by the said shank,—tumblers having recesses to engage the said wards, rotatably mounted on the said shank,—and permutating rings, rotatably and shiftably encircling and variably adjustably engaging the said tumblers,—the said tumblers also having radial openings wherethrough to pass the said wards to permit the same to be attached to the said locking bolt after the latter has been inserted into the said shank,—whereby the parts of the lock may be, substantially inseparably and undetachably, maintained in effective operative connection without the use of screws, rivets or soldered and kindred joints.

2. In a lock of the class described,—an apertured shank,—a locking bolt having wards, movably retained by the said shank,—tumblers having recesses to engage the said wards, rotatably mounted on the said shank,—and permutating rings rotatably and shiftably encircling the said tumblers,— the said tumblers and permutating rings having, relatively shiftably and variably adjustably arranged, mutually engaging teeth of such dimensions that the width of one of these teeth on the tumblers plus the width of one of those on the permutating rings is not greater than the width of one of the tumblers,—whereby the tumblers may be rotated together with their corresponding permutating rings only when the lock is closed, and the said permutating rings may be shifted independently and alone longitudinally and subsequently rotated when the lock is open,—to thereby readily change the combination of the lock without detaching any part therefrom and without the use of tools of any kind.

3. In a lock of the class described,—an apertured shank,—a locking bolt having wards, movably retained by the said shank,—tumblers having recesses to engage the said wards, rotatably mounted on the said shank,— permutating rings, rotatably and shiftably encircling and variably adjustably engaging the said tumblers,—and means for longitudinally yieldingly maintaining the said tumblers in engagement with their corresponding permutating rings,—whereby any accidental changing of the combination, when the lock is open, is substantially avoided.

4. In a permutation padlock, the combination of an apertured shank and locking bolt, wards removably inserted in said locking bolt, a plurality of sectional radially apertured tumblers, permutating rings and means for holding said permutating rings and tumblers in engagement.

5. In a permutation padlock, the combination of a plurality of permutating rings, a plurality of tumblers each provided with radial openings and recesses, means for holding said tumblers and permutating rings in engagement, a locking bolt carrying removable wards and an apertured shank surrounding said bolt.

6. In a permutation padlock, a plurality of permutating rings adjustably connected to sectional tumblers provided with radial openings and recesses, an apertured shank and a locking bolt carrying wards removably attached thereto.

In testimony whereof I have affixed my signature to this specification in the presence of two subscribing witnesses.

JOHN T. WHALEN.

Witnesses:
  LULU WARD,
  J. C. BLEK.